Dec. 5, 1933.  T. R. NEUTELINGS  1,938,110
MACHINE FOR CUTTING AND SHAPING CAKES AND BISCUITS
Filed Aug. 29, 1931
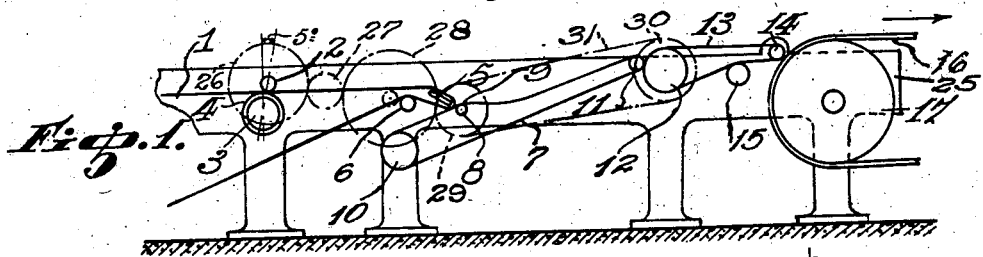
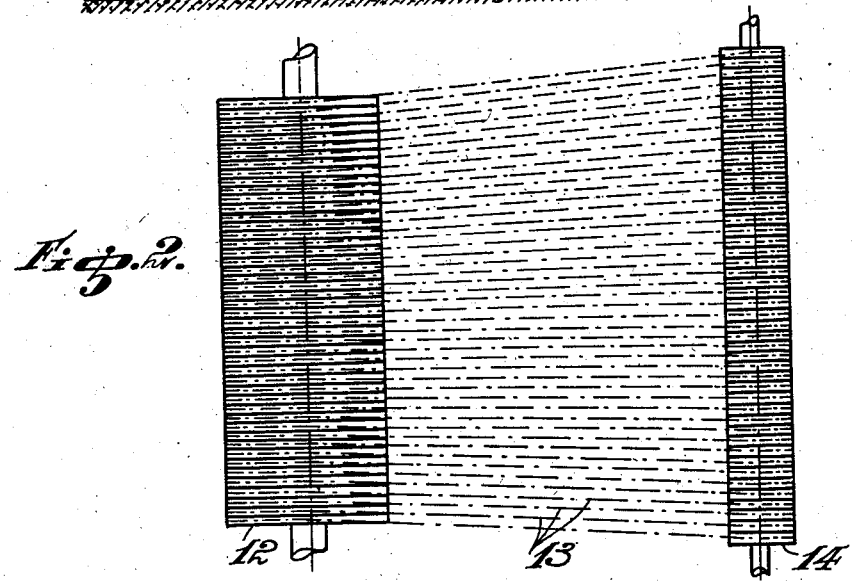
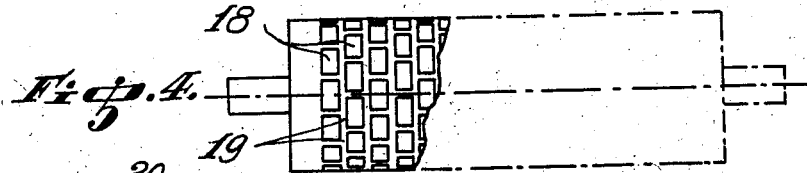
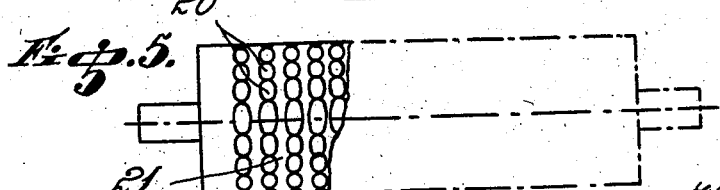
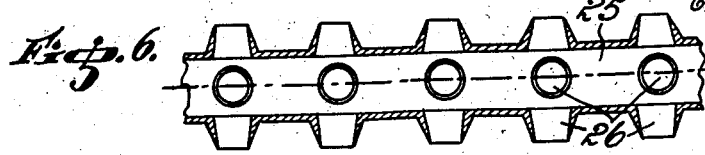

Patented Dec. 5, 1933

1,938,110

UNITED STATES PATENT OFFICE 1,938,110

MACHINE FOR CUTTING AND SHAPING CAKES AND BISCUITS

Theodoor Renier Neutelings, Bergen-op-Zoom, Netherlands

Application August 29, 1931, Serial No. 560,160, and in Belgium August 29, 1930

1 Claim. (Cl. 107—23)

The invention consists in a machine for continuously and automatically cutting and shaping biscuits and cakes from a sheet of dough without leaving scrap or at least reducing said scrap to a minimum.

The invention aims to cut and shape rectangular or square biscuits and cakes without producing scrap, whereas fancy shapes, such as oval or like biscuits will be cut and formed with a minimum of scrap.

In machines of this kind it is usual to shape the sheet of dough by means of a die roller in cooperation with a pressure roller, the sheet of dough being conveyed between said rollers by means of an endless conveyor. The dies of the die roller are separated from each other by free spaces which obviously leave a net of scrap to be continuously removed for the purpose of conveying the shaped biscuits, duly separated, upon subsequent aprons towards the oven.

In conformity with the invention, in the case of rectangular biscuits or cakes, no scrap forming spaces will be left between the dies of the shaping roller, whereas for fancy shapes, the dies will be arranged in annular series upon the die roller, and such series will be arranged close to one another, so that during the shaping of the biscuits, only narrow strips of scrap will be left between the successive series of dies. Such strips of scrap will be easily removed from between the shaped biscuits either manually or mechanically.

The invention furthermore provides for means to arrange the biscuits or cakes duly separated from each other upon a conveying band, so that the shaped pieces of dough will be delivered in a convenient orderly manner to the baking oven.

In the manufacture of rectangular biscuits without leaving scrap, the shaped pieces of dough have to be separated from each other as well in the longitudinal as in the transverse direction with respect to the machine. The separation in the longitudinal direction of the shaped cakes is performed by means of a conveying apron, the speed of which is higher than that of the conveyor upon which the biscuits are shaped, and when the cakes are progressing in rows separated from each other over a short distance, separation of the shaped cakes will be performed in the transverse direction with respect to the machine, by conveying the rows upon a particular apron, upon which the dough pieces will spread in a fan-shaped arrangement during their progressing movement, so as to become separated from each other in the transverse direction. From this fan-shaped conveyor to be described hereafter, the cakes are brought upon a baking sheet engaging the oven.

In the manufacture of fancy shapes, for instance oval or circular cakes, the intermediate strips of scrap which will be of reduced dimensions have to be lifted and removed, whereas the cakes will be separated from each other at their contacting heads by means of a conveying band having a higher speed.

The machine will be described hereafter with reference to the accompanying drawing. In the drawing:

Fig. 1 is a diagrammatic side elevation of the machine constructed according to the invention, the back side of the frame with driving gears being only shown;

Fig. 2 is a plan view of a fan-shaped conveyor;

Fig. 3 is a plan view of a die roller for shaping rectangular biscuits;

Fig. 4 is a plan view of a new die roller for manufacturing oval biscuits in conformity with the invention.

With reference to Fig. 1, it is known in such machines to have the dough rolled in a sheet of appropriate thickness, such sheets being conveyed by an endless conveyor 1 between the die roller 2 and the pressure roller 3, such pressure roller being for instance coated with a layer of rubber. The axes of both rollers are deviated from each other over an angle of about 5° with respect to the running direction of the conveying band 1, so that the tension of the conveyor cooperates with the pressure of the rollers upon each other to convey the sheet of dough nearly in a longitudinal direction between said rollers. The machine has a frame 25 mainly formed with lateral upright members supporting the rollers and driving means. The driving means of the die roller are variable and may for instance comprise a toothed gear 26, and such die rollers are interchangeable so that for instance biscuits can be shaped by means of rollers the diameter of which varies between 3 and 3.55 inches, whereas in the case of cakes made from consistent dough, die rollers having 7.8 to 15.7 inches of diameter can be used. It is obvious that the rotation of the die rollers will be varied according to the variable diameters.

The conveyor 1 brings the shaped cakes over a guiding plate 5, from which said conveyor is guided over a roller 6 to pass again over its usual driving rollers.

An endless apron 7, made for instance from a net of wire is running over rollers 10 and 11 and is passing over a roller 8 which conveniently constitutes a driving roller for said apron, and which is arranged close to the guiding plate 5, so that the shaped cakes will be brought from the conveying band 1 upon the conveying apron 7. Roller 8 is conveniently driven by the set of toothed gears 26, 27, 28 and 29, journalled in the upright frame member 25.

Owing to the weight of the conveyor 7 and its elasticity, this conveyor bends somewhat downwards over the roller 8, so that at this place the shaped pieces of dough have a crack imparted thereto in the transverse direction of the machine, so as to complete the break which started under the action of the die roller cutting the sheet of dough in successive rows of shaped cakes. The conveyor 7 has a somewhat higher speed, i. e. 20% higher than that of the conveyor 1, so that the longitudinal rows of shaped cakes will be arranged upon the conveyor 7 in separated rows. For the aforesaid operations it is obviously necessary to use a die roller 2, by means of which the cakes or biscuits are shaped without intermediate free spaces for side scrap, i. e. that the die roller 2 (see Fig. 3) is provided with moulds, namely rectangular moulds 22, which are only separated from each other by sharp cutting edges 23.

Such improved die roller secures a greater output and means economy of dough, and also considerably reduces waste in the form of badly moulded or broken biscuits or cakes.

The conveyor 7 will bring the separated rows of cakes close to the conveyor 13, which is guided over rollers 12, 14 and 15; the roller 12 is driven by a chain wheel 30 and an endless chain 31 running over another chain wheel coaxial with gear 29. Said conveyor 13 is adapted for the purpose of separating the biscuits and cakes in a transverse direction; it will therefore be of particular construction to convey the cakes or biscuits in a spreading or fan-shaped arrangement.

With reference to Fig. 2, the conveyor 13 is constituted by means of a considerable number of small endless strips of rubber or of strips of perforated wire, said strips being guided in grooves provided on the rollers 12 and 14. The number of grooves for both rollers is the same, but the grooves of roller 14 are separated fom each other by a somewhat greater distance than is the case for the grooves of roller 12. From this results that the different strips are spreading from each other in their progressing direction, although running at the same speed, and the small difference in length which occurs between the different conveying strips is compensated by the nature of the material used, the strips being made of rubber or perforated wire. It is obvious that the shaped cakes will follow the spreading action of this conveyor, so that they will become separated from each other at their cut portions. The so separated biscuits will be brought by the conveyor 13 upon the baking plate 16. This baking plate 16 is running over the drum 17 and conveys the biscuits or cakes throughout the baking oven.

The conveyor 13 can obviously be made with a number of bands or strips corresponding to the number of cakes shaped with relation to the transverse direction of the machine.

For the manufacture of cakes of fancy shape, such as for instance oval cakes 20 (Fig. 4), the best arrangement will be secured for instance by providing rings of dies 20 separated by free spaces 21, these dies leaving a continuous side scrap, which is more easily removable than separated pieces of scrap, which are for instance left in the case of dies contacting each other in both transverse and longitudinal directions.

The shaped cakes in this arrangement will also be separated in the longitudinal direction by the conveyor 7 running at a somewhat higher speed.

A simplification in the machine would consist in abandoning the conveyor 7 having a somewhat higher speed. However, in this case the conveyor 13 should have a higher speed than conveyor 1, so that both operations are performed upon conveyor 13.

The new machine presents the advantage of cutting and shaping cakes and biscuits in a continuous and automatic manner, with that particular result that the complete plant inclusive of the baking oven provides for a considerable reduction in scrap, broken or bruised biscuits or cakes, whereas the production is simultaneously increased without necessitating higher driving power.

The considerable reduction of scrap or its complete elimination constitutes an economy which has an indirect influence upon the quality of the production itself, as such scrap generally brought back in the manufacture did not remain homogeneous with the original dough, in consequence of the operations to which said scrap has been exposed.

I claim:

In a machine for cutting and shaping cakes and biscuits, the combination of a die roller having moulds formed with sharp cutting edges, a pressure roller, a conveyor passing between both rollers, a second conveyor adjacent to the first mentioned one and running at a somewhat higher speed, a third conveyor of the endless belt type adjacent to the second one and formed with a plurality of endless strips radiating from each other so as to spread the shaped dough pieces in a fan-shaped arrangement and means for transporting the separated cakes and biscuits for further treatment.

THEODOOR RENIER NEUTELINGS.